2,993,030
PROCESS FOR POLYMERIZING VINYLENE CARBONATE

George E. Ham and Morris Zief, Easton, Pa. (both % J. T. Baker Chemical Company, Phillipsburg, N.J.)
No Drawing. Filed Aug. 19, 1957, Ser. No. 679,103
4 Claims. (Cl. 260—77.5)

Our invention relates to novel high molecular weight polymers of vinylene carbonate and a novel method for their preparation.

Vinylene carbonate,

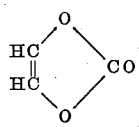

can be prepared by the chlorination of ethylene carbonate to chloroethylene carbonate followed by dehydrochlorination, e.g., with triethylamine, to produce the vinylene carbonate.

Certain polymers, as discussed below, of vinylene carbonate have been disclosed but the disclosed polymers at best possessed very low molecular weights and undesirable properties such as brittleness. They have no utility in the manufacture of useful plastic compositions such as films and fibers.

Newman et al., JACS, 77, 3789–3793 (1955), disclose the preparation of polyvinylene carbonate by mass polymerization technique using a benzoyl peroxide catalyst. The polymers were stated to be brittle. Repetition of the experiments described in this publication produced similar low molecular weight products, i.e. with an intrinsic viscosity as measured in dimethylformamide at 20° C. of below about 0.13. The products yielded brittle films from dimethylformamide solutions. Such films have no practical utility.

We have now found surprisingly that high molecular weight, tough polymers of vinylene carbonate which provide films and fibers of good strength are produced by polymerizing the vinylene carbonate monomer in aqueous medium in the presence of certain persulfates as catalysts. It is particularly surprising that such polymers are obtained by this aqueous method as it would be expected that premature hydrolysis would prevent or at least interfere with such a polymerization.

The persulfates which are used as catalysts in our invention are ammonium persulfate and alkali metal persulfates, particularly potassium and sodium persulfates. Ammonium persulfate is preferred as it appears to be more effective than the alkali metal persulfates. Advantageously, the catalysts are used in concentration of about 0.005 to about 5 percent by weight of the vinylene carbonate monomer.

In the aqueous method of our invention sufficient water is used to provide a medium for the polymerization. Advantageously, a weight ratio of water to vinylene carbonate monomer of as high as about 20 to 1 and as low as about 1 to 10 can be used. Preferably, a ratio of about 2 to 1 is used. Vinylene carbonate is partially soluble in water but at the preferred water to vinylene carbonate ratio some vinylene carbonate is present as a separate phase. It is probable, however, that the water-soluble portion alone polymerizes and the remainder dissolves during the reaction. The polymer forms during the polymerization as a finely divided, dispersed, insoluble, white powder which can be readily filtered and isolated. In view of the above, the polymerization technique can be termed suspension polymerization although some monomer is in solution and it may be that this portion alone polymerizes.

Polymerization proceeds at about room temperature but temperatures of between about 0° C. to about 120° C. can be used. Elevated pressures can be used. Preferably, oxygen is excluded to provide products of better color.

The polymerization proceeds well without activators although they can be used if desired. Certain activators such as sodium bisulfite, ferrous sulfate and hydroquinone have been found to produce lower molecular weight products, however. Salts, alcohols or glycols can be added to depress the freezing point or elevate the boiling point of the aqueous mixture of monomer and catalyst.

The novel products produced by the method of our invention are polymers of vinylene carbonate in which the intrinsic viscosity is more than about 0.3, as determined in a solution of dimethylformamide at 20° C. The intrinsic viscosity must be more than this value to obtain products of useful properties.

The method of our invention produces polyvinylene carbonate which provides fibers of good strength and utility and clear, colorless films of good strength which have value in packaging and electrical insulation, for example. The films can be formed by the casting and drying solutions of the polyvinylene carbonate and the fibers by extrusion in a suitable precipitant in accordance with conventional procedures.

The method and compositions of our invention will be further illustrated by reference to the following examples.

Example I

To 28.8 g. of vinylene carbonate were added 46.1 mg. (0.16%) of benzoyl peroxide in a suitable container. The reaction mixture was heated in a nitrogen atmosphere at 78° C. for 17 hours. The product was extracted with dioxane to remove excess monomer.

8.67 grams (30% conversion) of polymer product were obtained. The product had an intrinsic viscosity of only 0.126 as measured in dimethylformamide at 20° C. In a similar run using 1% of benzoyl peroxide, the intrinsic viscosity of the product was reduced to only 0.106.

This low molecular weight polymer yielded undesirable brittle films on casting from dimethylformamide solutions.

Example II

Ten grams of vinylene carbonate, 20 ml. of freshly distilled water and 200 mg. of ammonium persulfate (2% of catalyst based on monomer) were placed in a 250 ml. round-bottomed flask equipped with a stirrer. The flask was flushed with nitrogen, then stirred at 25° C. for 24 hours. A colorless, insoluble polymer product formed which was a finely divided white solid and was filtered off, washed with water and dried in a dessicator.

8.4 grams (84% conversion) of polymer product were obtained. The product had an intrinsic viscosity of 0.43 as measured in dimethylformamide solution at 20° C.

This high molecular weight polymer of vinylene carbonate yielded clear, colorless films of good strength on casting from dimethylformamide solution.

Example III

In a run similar to Example II, 1% ammonium persulfate was used and a polymer product in 72% conversion was obtained which had an intrinsic viscosity of 0.57 measured in dimethylformamide at 20° C.

This high molecular weight polymer of vinylene carbonate yielded clear, strong films on casting from a 4% solution of dimethylformamide and drying at 65° C. Similar films were obtained on casting from 10, 15 and 20% solutions in dimethylformamide.

The high molecular weight polymer also yielded tough fibers when the solution was ejected from a hypodermic needle into a tray of water and the resulting fiber stretched under water immediately after its formation.

*Example IV*

In a run similar to Example II, 3% potassium persulfate was used and a polymer product in 50% conversion was obtained which had an intrinsic viscosity of 0.394 as measured in dimethylformamide at 20° C. The dry samples of polyvinylene carbonate decomposed at 250°–260° C.

Sodium bisulfite, ferrous sulfate and hydroquinone were also employed as activators in duplications of this run and products of an intrinsic viscosity of more than 0.3 were obtained. Higher molecular weights were obtained, however, when these activators were not used.

The high molecular weight polymer of vinylene carbonate yielded films of moderate strength on casting from dimethylformamide solutions and drying.

By the term intrinsic viscosity as used herein, we mean the value of [$\eta$] obtained by the experimental determination of specific viscosity $\eta_{sp}$ and calculated from the following equation $$[\eta] = \left[\eta \frac{sp}{C}\right]$$
$$C \to 0$$

where C is the concentration in grams of polymer per 100 mls. of solution. See also page 30 of Vinyl and Related Polymers, C. E. Schildknecht, John Wiley and Sons, Inc., New York, 1952.

We claim:

1. The process which comprises homopolymerizing vinylene carbonate by agitating a mixture of water and vinylene carbonate in proportions ranging from 1 to 10 parts by weight of vinylene carbonate with 1 to 20 parts by weight of water in the presence of 0.005 to 5% by weight based on the vinylene carbonate present in said mixture of a persulfate polymerizing catalyst selected from the group consisting of ammonium persulfate and alkali metal persulfates at atmospheric pressure in the absence of oxygen and collecting the finally divided water insoluble polymeric vinylene carbonate which is formed.

2. A process in accordance with claim 1 in which the catalyst is ammonium persulfate.

3. A process in accordance with claim 1 in which the catalyst is potassium persulfate.

4. A process in accordance with claim 1 in which the ratio of water to vinylene carbonate is about 2 to 1.

References Cited in the file of this patent

UNITED STATES PATENTS

| | | |
|---|---|---|
| 2,522,680 | Kropa et al. | Sept. 19, 1950 |
| 2,722,525 | Price et al. | Nov. 1, 1955 |
| 2,847,402 | Gluesenkamp et al. | Aug. 12, 1958 |
| 2,873,230 | Thomas | Feb. 10, 1959 |

FOREIGN PATENTS

| | | |
|---|---|---|
| 778,020 | Great Britain | July 3, 1957 |